INVENTORS
JOHN E. BRANNON &
LOUIS CONN, Jr.

BY their ATTORNEYS

United States Patent Office 3,530,958
Patented Sept. 29, 1970

3,530,958
VISCOSITY CONTROL MEANS FOR FLUID OF HYDRAULIC ELEVATOR SYSTEMS
John E. Brannon and Louis Conn, Jr., Memphis, Tenn., assignors to Dover Corporation, Memphis, Tenn., a corporation of Delaware
Filed Aug. 16, 1968, Ser. No. 753,105
Int. Cl. B66b 1/04
U.S. Cl. 187—17                    14 Claims

ABSTRACT OF THE DISCLOSURE

In a hydraulic elevator installation, a thermostat is included in a closed loop path in which oil may be recirculated by a pump. A valve controls exchange of fluid between such path and the jack for the cab so as to cause the cab to move up and down or be parked. The thermostat responds to a drop in oil temperature to a cut-invalve to cause the pump to recirculate fluid in the mentioned path until the oil is heated by turbulence effects to a selected higher cut-off temperature. Recirculation for heating purposes is continuous over the period the thermostat signals for heat except when the cab is required to respond to a down movement signal. In the absence of other control, the cab is lowered to and kept at the lowest floor in response to the thermostat signal so that most of the oil of the system is out of the jack and in the closed loop path to be subject to heating.

---

Figure 1:
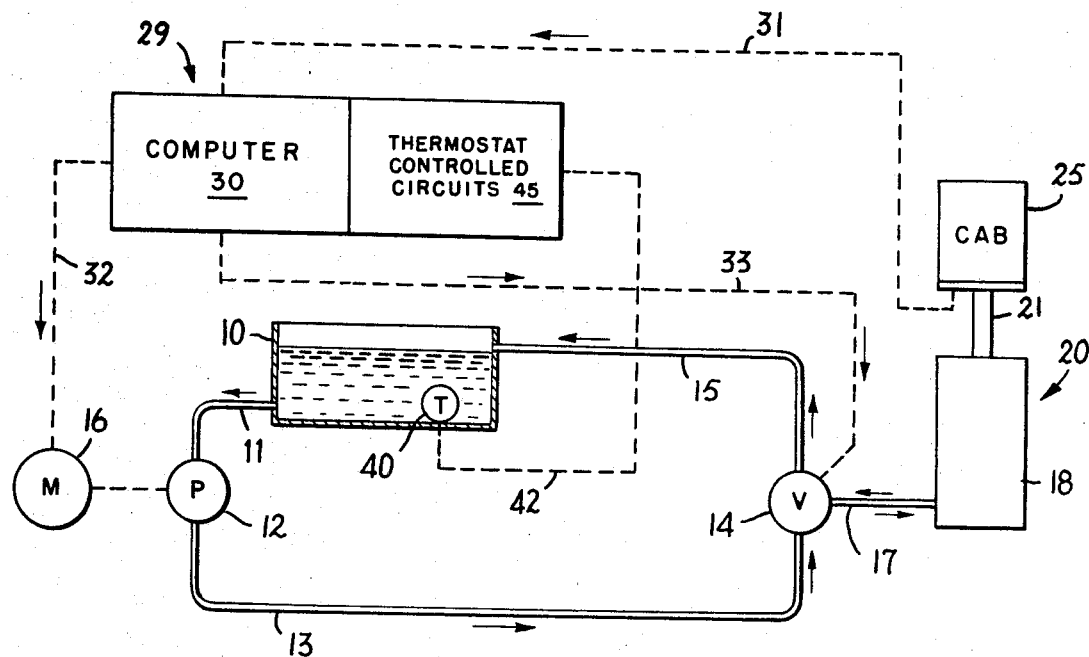

This invention relates to hydraulically operated elevator equipment and, more particularly, to means in such equipment for maintaining substantially constant the viscositiy of the oil or other hydraulic fluid which is employed.

One of the troublesome problems in the adjustment of a hydraulic elevator is caused by changes in oil viscosity with temperature. Each time the elevator runs, some heat is generated in the oil. The resulting change in oil viscositiy effects the volumetric efficiency of the pump as well as the operation of valves and, therefore, effects the final leveling speed and stopping accuracy of the elevator.

It has been common practice to install thermostatically controlled heaters in the oil reservoir to keep the temperature above some minimum value. There are, however, several disadvantages to such practice. First, of course, is the cost of the heaters themselves. Also, a system which employs heaters relies on convection currents to diffuse the heat throughout the oil. If the thermostat is physically close to the heater, it shuts off too soon whereas, if it is far away from the heater, the oil around the heater can become too hot before the thermostat reacts. If the elevator is parked at one of the upper floors, there will be very little oil in the reservoir, with the bulk of the oil cooling rapidly in the jack.

An object of the present invention is to partly or wholly obviate one or more of the above-noted disadvantages of the described prior art practice.

Another object of the invention is to provide for temperature and viscosity control of the fluid in hydraulic elevator equipment in a manner which is fully compatible with the normal operation of the equipment.

These and other objects are realized according to the invention by utilizing as a fluid heating means the pump means employed in the hydraulic elevator installation. More specifically, such pump means is subjected to two modes of control, namely, the normal control associated with the movements of the elevator cab and an additional control provided by thermostat means which senses the temperature of the fluid. When that temperature drops below a selected value, the thermostat means is cut in to produce a signal which indicates a need for heating the fluid, and which lasts until the thermostat means is deactuated by a rise in fluid temperature to a higher selected value. Such indicating signal actuates relay means or other circuit means to energize the pump means to pump fluid so as to produce heating of the oil to the desired higher value. Such heating is caused by the turbulence created in the fluid as the result of the pumping thereof. As the fluid is so being heated, the operation of the mentioned circuit means is integrated with that of the electrical relay system (or other computer means) for controlling elevator movements such that those movements may occur in a normal manner in the course of the fluid heating. Since there is a direct relationship between the temperature of the fluid and the viscosity thereof, the overall effect of the described temperature control of the fluid is to keep substantially constant the viscosity of the fluid.

In its broadest aspect, the invention is not limited to any particular system of hydraulic drive for the elevator installation. Thus, for example, the invention embraces installations employing open-loop hydraulic systems wherein there is no by-pass for fluid flowing between reservoir means therefor and the jack means for the elevator cab, wherein heating of the fluid is accomplished in the absence of calls by causing the cab to make dummy runs up and down the shaft. As another example, the invention embraces elevator installations wherein the fluid is heated by the making of dummy runs as just described, but wherein the hydraulic drive system is of a closed loop sort such that a portion of the fluid which would normally flow directly between the pump means and the jack means is by-passed to a selective degree around the jack means or the pump means (as the case may be) through by-pass means leading to the reservoir, the movement of the cab being controlled by selectively controlling the amount of fluid flow through the by-pass means.

In its preferred form, however, the invention relates to elevator installations with hydraulic systems which are rendered of closed-loop configuration by the mentioned by-pass means, and in which heating of the fluid is primarily accomplished by recirculation of the fluid in the closed loop path therefor. As an aspect of the preferred form of the invention, if the cab is above the lowest floor when the thermostat means first signals for heat, the cab is lowered to that floor and is kept at such floor in the absence of calls requiring up movement of the cab. In this way, most of the fluid in the jack means is forced out of the jack means and into the recirculation path so as to be subject to recirculatory heating.

Figure 2:
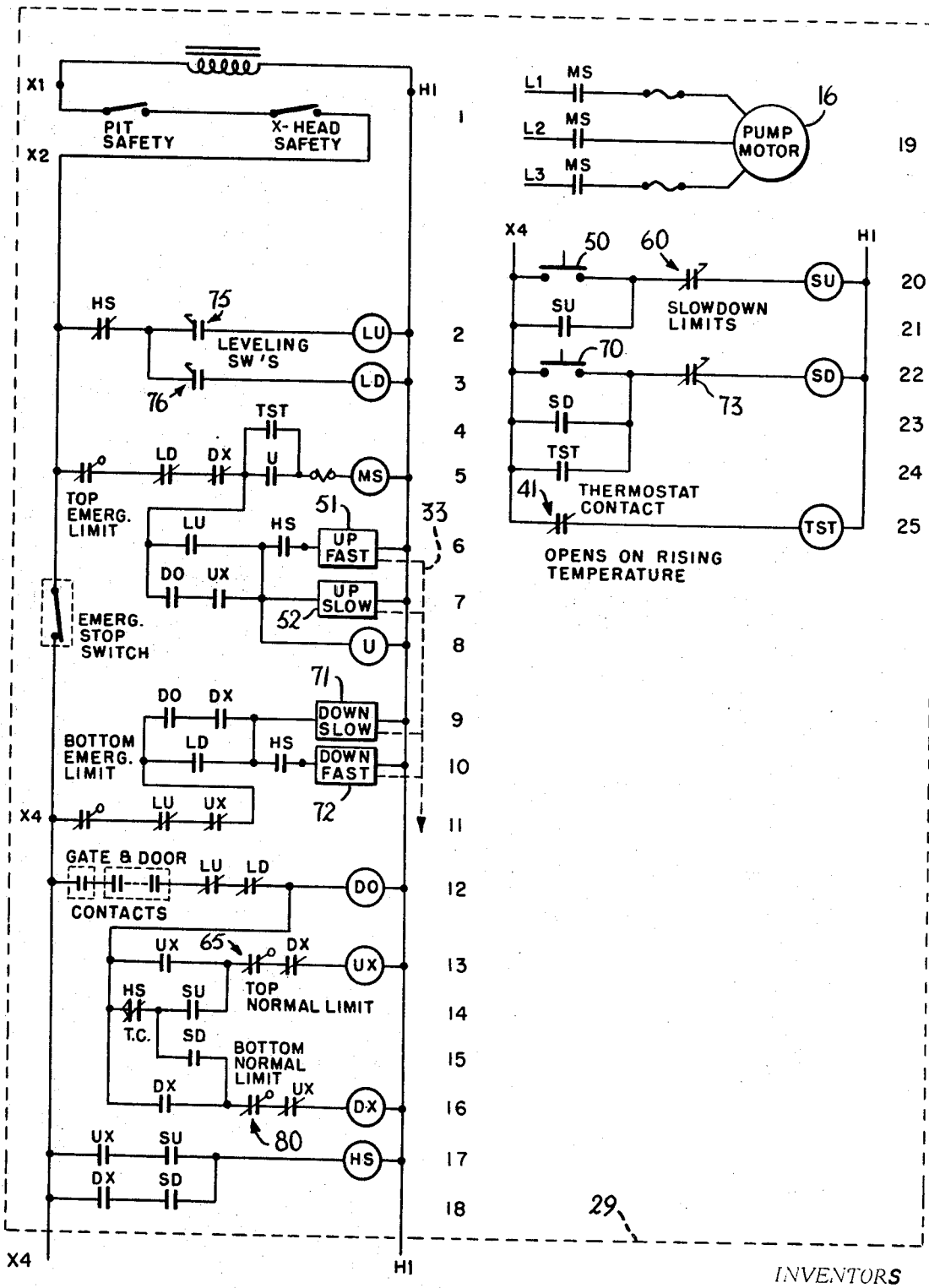

For a better understanding of the invention, reference is made to the following description of a representative embodiment thereof and to the accompanying drawings wherein:

FIG. 1 is a schematic diagram of a hydraulic elevator installation according to the invention; and FIG. 2 is a schematic diagram of electrical components of the installation of FIG. 1.

Referring now to FIG. 1, depicted thereby in schematic form is a hydraulic elevator installation using oil as the hydraulic fluid. In that installation, the outlet of an oil reservoir or tank 10 is connected by a line 11 to the inlet of a pump 12 of a type conventionally used for hydraulic elevators. Pump 12 is driven by an electric motor 16 when that motor is energized. The outlet of the pump is connected by a line 13 to a value 14 of the sort disclosed in, say, United States Pat. No. 3,302,531 granted Feb. 7, 1967 in the name of Arbogast et al. As shown, the valve 14 is at the junction of line 13 and two other lines 15 and 17 of which 15 is a by-pass line leading back to reservoir 10. Line 17 leads to the hydraulic cylinder 18 of a jack 20 also comprised of a plunger 21 slidably received in the cylinder. The upper end of the plunger is coupled to the underside of an elevator cab 25 movable vertically within a shaft (not shown).

The described hydraulic system is under the control of a computer means 30 forming a part of an over-all electrical control system 29 for the installation. In the disclosed embodiment, the computer 30 is in the form of a conventional relay system. Alternatively, the computer may be of a more sophisticated type in which switching and other operations are performed by solid state elements such as transistors, SCR devices and the like.

Computer 30 is supplied by a cable 31 with signals which are representative (among other things) of movements to be undertaken by the cab 25. While those signals are depicted in FIG. 1 as originating at the cab, it will be understood that they may originate elsewhere as, for example, at call buttons in the halls of the floors serviced by the cab or from leveling contacts or other electrical elements mounted in the elevator shaft. The computer 30 responds to signals transmitted over cable 31 to control the pump and valve of the hydraulic system so as to cause that system to carry out the operations required by those signals.

More specifically, computer 30 is coupled by cable 32 to motor 16 to selectively cause either energization and de-energization of the pump 12. Moreover, computer 30 is coupled by connection 33 to valve 14 to selectively control the setting of that valve. Such valve may be adjusted by the computer to any one of the settings of "fast up," "slow up," "neutral," slow down" and "fast down."

If computer 30 receives over cable 31 a signal which represents an "up" call for the cab, the computer responds to that signal to energize motor 16 and pump 12 to cause pumping of oil from reservoir 10 through the lines 11 and 13 and to valve 14. That valve selectively distributes between lines 15 and 17 the oil which reaches it via line 13. If that valve should remain at its neutral setting, the pressure developed in line 17 by the pump at full speed would be insufficient to displace the plunger 21 to move the cab upward. Hence, for that neutral setting, all of the oil pumped through line 13 would be by-passed around jack 20 and returned via by-pass line 15 to the reservoir 10 to be recirculated in the closed-loop path formed of elements 10–15.

In the presence of an "up" call signal, valve 14 is set by the computer to cause a portion of the oil in the system to be diverted from the closed-loop path 10–15 and to flow through line 17 to jack 20 to produce an upward movement of the cab. As is conventional in an installation of the sort described, the computer is actuated by the "up" call to adjust the mentioned valve successively to its "fast up" and "fast down" settings so as to cause the cab to undergo first a fast up movement and then subsequent slow up movement which occurs as the cab approaches the floor designated by the call. The speed with which the cab moves up is a function of the proportions in which the valve 14 distributes between lines 15 and 17 the inflow to the valve of oil from lead 13. That is, the upward speed of the cab is relatively faster and slower when valve 14 diverts to line 17 relatively more and less, respectively, of the inflow of oil to the valve.

In between call signals, the motor 16 and pump 12 are normally de-energized, and valve 14 is maintained at its neutral setting which blocks the flow through line 17 of oil from the cylinder 18 of the jack. In those circumstances, cab 20 is normally maintained parked at the floor at which it last stopped. If, however, the cab should creep up or down while in parked condition, the creep is corrected by an appropriate leveling movement initiated by a leveling signal fed over the cable 31 to the computer. If such signal is an up-leveling one, an up-leveling movement of the cab is effected by computer control similar to that already described for an "up" call movement except that the computer adjusts valve 14 directly to its "up slow" setting.

If, while the cab is parked at an upper floor (such that pump 12 is de-energized and valve 14 is set to "neutral"), the computer 30 receives over cable 31 a "down" call signal, the response to that signal is that pump 12 remains de-energized, but the computer adjusts valve 14 first to its "down fast" setting and then to its "down slow" setting. For either of such settings, valve 14 allows the weight of the cab to force oil to flow out of the cylinder 18 and into line 15 and tank 10. During that oil flow, line 15 acts as a by-pass around pump 12. The cab responds to the successive settings of the valve to move down at a speed with is first rapid and is then slower as the cab approaches the designated floor. The speed of downward movement of the cab is a function of the degree to which the valve 14 throttles the flow of oil from line 17 to the line 15 and the tank 10, the speed becoming greater as the amount of throttling becomes less.

In the event the down movement signal over cable 31 is a down leveling signal instead of a "down" call signal, the cab is moved downward under computer control in a manner alike to that just described excepting that the computer adjusts the valve 14 directly to its "down slow" setting.

As so far discussed, the hydraulic elevator installation of FIG. 1 is conventional.

Continuing with the FIG. 1 installation, it is the valve 14 which controls the speeds and acceleration and deceleration rates of the cab 25. If the valve is aligned to yield optimum speed values and acceleration and deceleration values at one oil temperature, it will not yield the same values at a different oil temperature because the oil viscosity changes with the temperature. Temperature changes are caused because the oil becomes hotter as work is done on it to drive the cab. Usually, the valve 14 is aligned to give the optimum speed and change-in-speed values at the hot temperature. It follows that, if there is an extended period of inactivity such that the oil cools and its viscosity increases, immediately subsequent movements of the cab are not characterized by optimum speed and acceleration and deceleration rates.

The problem just discussed of stabilizing rates is overcome in the FIG. 1 installation in a manner as follows.

Incorporated in the closed-loop path 10–15 for the oil is a thermostat mechanism 40 disposed in the bottom of the reservoir 10. Mechanism 40 is a conventional type of thermostat comprised of a temperature sensing device coupled with contacts 41 (FIG. 2) to render such contacts closed and opened when, respectively, the sensed temperature of the oil drops below a first thermostat cut-in value and rises from such first value to a second higher thermostat cut-out value. The thermostat is thus of the well known differential make-break type which is not actuated to close its contact until the sensed temperature drops to a lower limit value but which, when once actuated is not deactuated to open its contacts until the sensed temperature rises to an upper limit value. Each of those limit defining temperature valves may be selectively chosen and set on the thermostat by appropriate manual adjustment of the thermostat mechanism. In lieu of using one such thermostat of the differential type, it is equally feasible to employ two non-differential thermostats which are se to be separately actuated by oil temperatures corresponding to, respectively, the selected cut-in value and the selected cut-out value, the two devices being interconnected to conjointly provide a differential effect similar to that already described.

To state in somewhat more detail, the response of thermostat 40 to changes in oil temperature, if such temperature is initially in the range above the selected cut-in value, the thermostat 40 remains de-actuated in the presence of temperature changes so long as the temperature stays in that range. If, however, the oil temperature is initially below the cut-in value or, although not initially below it, drops to that value, then the contacts 41 of the thermostat become closed to develop on a cable 42 (FIGS. 1 and 2) a signal indicating need for heating of the oil. Once contacts 41 have so closed, they remain closed and the indicating signal lasts until the oil temperature rises to the selected cut-out value. Thereupon, the thermostat is deactuated to open the contacts 41 and to terminate the indicating signal. Subsequently, the thermostat remains deactuated until the oil temperature once again drops down to the cut-in value.

A failure of the thermostat to open contacts 41 upon reaching the cut-out value may be compensated for by the use of a timer (not shown) which opens those contacts at the end of a delay interval (initiated concurrently with the closing of the contacts) if such contacts have not meanwhile opened. The delay interval is chosen to be long enough that the contacts would normally close under thermostat control before the interval terminates.

Cable 42 is connected to supply the mentioned indicating signal to the thermostat-controlled circuits 45 shown in FIG. 1 is forming a portion of the overall electrical system 29. Those circuits 45 are interconnected with the computer portion 30 to modify the operation of computer 30 in a manner which will now be generally described.

If cab 20 is parked at its lower floor and valve 14 is set to "neutral" when thermostat 40 first signals for oil heating, the computer 30 responds through circuits 45 to the heat-needed indicating signal to energize motor 16 and pump 12 so that the latter begins to pump oil. With the valve being so set to "neutral" and the pump operating at full speed, the oil pressure developed in line 17 is insufficient to move cab 25 upwards. Hence, all of the pumped oil is recirculated around closed-loop path 10-15 to be heated by the turbulence created by the withdrawal of oil to that tank. The oil in the closed-loop path is so reheated by recirculation until the oil temperature rises to the cut-out value to cause deactuation of the thermostat and termination of the indicating signal therefrom. Computer 30 then responds through circuits 45 to the signal termination to de-energize the motor and pump to thereby return the hydraulic system to its normal condition in which oil is not pumped while the cab 25 is parked.

It should be noted that heating of the oil by recirculation may be either continuous or intermittent. Continous heating is produced when there is no occasion to move the cab down over the period during which the oil temperature is rising towards the cut-out value. Intermittent heating is produced when the energization of the pump must be interrupted one or more times in the course of such period in order to permit the cab to make a down movement. As later explained in more detail, the recirculatory heating of the oil under thermostat control in no way interferes with the ability of the FIG. 1 installation to operate in the course of the oil heating period so as to effect all movements of the cab which would be effected in an installation wholly similar except lacking the feature of recirculatory oil heating under thermostat control.

By virtue of the described mode of keeping the oil temperature within a narrow range, the viscosity of the oil is maintained substantially constant so as to cause cab rides between the same points to be substantially the same at all times in respect to cab speeds and acceleration and de-acceleration.

Some of the advantages of heating oil by recirculation are as follows. First, because the same components (except for the elements 40 and 45) are used to effect the heating as are used in the normal operation of the installation, the cost of separate heaters is saved. Second, the turbulence created by the recirculatory heating assures that the oil in the closed loop path 10-15 will be heated evenly throughout so as to avoid areas of localized heat. Third, the placing of the thermostat in the recirculation path exposes that temperature sensitive device directly to the whole volume of oil being heated at the site where the heating is taking place to thereby provide an accurate and undelayed sensing by the thermostat of the temperature of the oil in the system which is being heated.

Fourth, since there is very little oil in the cylinder 18 when the cab 25 is parked at its lower floor, almost all of the volume of oil in the system is subjected to heat so as to avoid the uneven heating which would occur if a sizable fraction of that volume were to be retained in the relatively cool cylinder 18.

It is often the case that cab 25 will be above its lower floor when the thermostat 40 is first actuated. In order, therefore, to realize the fourth mentioned advantage, it is necessary that the cab be returned to and parked at its lower floor to there remain in the absence of up "call" signals. Such return of the cab is accomplished by interconnecting circuits 45 with computer 30 so as to cause that computer to control valve 14 to move the cab to the lowest floor before the computer energizes the pump 12 for the purpose of recirculatory heating of that oil.

FIG. 2 is a schematic diagram of the overall electrical system 29 of the FIG. 1 installation. For convenience of understanding, the system 29 as shown in FIG. 2 has been simplified to omit many of the components normally used in a hydraulic elevator installation. For example, the shown FIG. 2 system omits the components which are ordinarily present to provide service by the cab for floors intermediate the highest floor and the lowest floor at which the cab stops. It is to be understood, however, that the invention hereof is not limited to the simplified control system shown in FIG. 2 but, instead, extends to the full control system used in practice in hydraulic elevator installations.

The operation of the FIG. 2 system is as follows:

Assume to began with that cab 25 is parked at the lowest floor, valve 14 is set to "neutral," thermostat 14 is deactuated, door relay DO (line 12) has been energized by closure of the door on a passenger who has entered the cab, and the passenger has pushed on up button 50 (line 20). The closure of contacts 50 energizes up call relay SU (line 20) to become self-holding by the SU contacts at line 21 and to close the SU contacts at line 14 to thereby energize up-movement relay UX (line 13). Energized UX relay becomes self holding by UX contacts at line 13 and, also closes UX contacts at line 7 to energize relay U (line 8) through the closed UX and DO contacts in series. Energized relay U closes contacts U (line 5) to energize motor start relay MS (line 5) to close contacts MS (line 19) to thereby energize motor 16 to drive pump 12 (FIG. 1).

The energization of relay UX (line 12) also closes UX contacts at line 17 to complete through those UX contacts (and the already-closed serially coupled SU contacts) a circuit for energizing high speed relay HS (line 17). The latter energized relay closes HS contacts at line 6 to energize up-fast solenoid 51 in parallel with up-slow solenoid 52 which has already been energized by closure of the UX contacts at line 7. Solenoids 51 and 52 are coupled through connector 33 with valve 44 such that energization of both solenoids adjusts the valve to its "up-fast" setting. With valve 14 being so adjusted and pump 12 running at full speed, the hydraulic system initially moves cab 25 at fast speed towards its upper floor.

As the cab nears that floor, it opens slow-down contacts 60 (line 20) to de-energize relay SU to cause opening of the SU contacts at line 17 to thereby de-energize high speed relay HS. The resulting opening of the HS contacts at line 6 drops out up-fast solenoid 51. The up-slow solenoid 52, however, is still energized by the circuit through the UX contacts at line 7 which remains closed because the UX relay is still self-holding by its contacts at line 13. When only solenoid 52 is energized, the connector 33 adjusts valve 14 to its "up-slow" setting and, since pump motor 16 is still energized, the cab 25 now approaches the upper floor at slow speed.

Upon reaching the upper floor, cab 25 opens the top normal limit contacts 65 at line 13 to drop-out relay UX. The contacts at line 7 de-energize the solenoid 52 to cause connector 33 to reset valve 14 to "neutral." Further, the opening of those UX contacts de-energizes the U relay (line 8) to open the U contacts at line 5 to de-energize the MS relay to cause opening of the MS contacts (line 19) and consequent de-energization of the pump motor 16 and the pump 12. Hence, cab 25 becomes parked at its upper floor with pump 12 being de-energized and valve 14 being at neutral setting.

When the car is parked at its uper floor and a passenger enters the cab, closes the door and pushes the "down" button 70 (line 22) the sequence of operations which return the cab to the lower floor is generally analogous to the previously described upward movement sequence. The door sequence will be understood by considering that the relays (and associated contacts) SU and UX are replaced by, respectively, the relays (and associated contacts) SD and DX, and by considering that the up slow-down contacts 60 are replaced by the down slow-down contacts 73 and solenoids 51 and 52 are replaced by, respectively, the down-fast solenoid 71 (line 9) and the down-slow solenoid 72 (line 10). Energization of both solenoids 71 and 72 adjust valve 14 to its "down-fast" setting whereas energization of only solenoid 72 adjust the valve to its "down-slow" setting.

A difference between the up and down sequences of operation is that the down sequence does not involve any relay corresponding to the earlier described relay U which initiates energization of the motor start relay MS. the pump motor 16 and the pump 12. Hence, during a down movement of the cab, there is no pumping of oil. For both the up and down directions of movement, the cab first undergoes a fast movement and next a slow movement and finally becomes parked at its destined floor with pump 12 then being de-energized and valve 14 then being set at "neutral."

If, while parked, the cab creeps down, it closes the contacts of an up-leveling switch 75 (line 2) to energize an up-level relay LU to cause closure of LU contacts (line 6) producing energization of relay U (line 8) and of up-slow solenoid 52 (line 7). Thereupon, motor 16 and pump 12 are energized and valve 14 is adjusted to its "up-slow" setting to produce slow upward movement of the cab. At about the time the cab reaches its proper parked position, the contacts 75 re-open to effect de-energization of elements U and 52 so as to cause de-actuation of the pump 12 and resetting of the valve 14 to "neutral." The cab accordingly stops level with the floor.

Conversely, a creeping up of the cab closes down-leveling contacts 76 (line 3) to energize relay LD having LD contacts (line 10) which responsively close to energize the down-slow solenoid 71 to adjust valve 14 to its down-slow setting. Thereupon the cab settles until contacts 76 re-open to cause de-energization of solenoid 71 and resetting of the valve to neutral and a stopping of the cab at floor level.

In discussing the system 29 shown in FIG. 2, it has heretofore been assumed that thermostat 40 is not actuated. Accordingly, the description so far given of the system 29 is equally applicable to such system if it had no thermostat 40 and accompanying thermostat controlled circuits 45 (FIG. 1). That is, the discussion so far is, in essence, of the conventional computer portion 30 (FIG. 1) of the system 29.

Coming now to the effects of thermostat 40 and circuits 45 on the FIG. 2 system, assume as before that cab 25 is parked at its lower floor with pump 12 de-energized and valve 14 being set to "neutral." Assume further, however, that thermostat 40 senses a drop in oil temperature to the thermostat cut-in value so as to close contacts 41. The resulting indicating signal on lead 42 energizes a thermostat relay TST (line 25) to close the TST contacts shown at line 4. Those contacts are across the U contacts which energize relay MS in response to an up "call' so that even, in the absence of such call, relay MS becomes energized when thermostat 40 signals for heat. As before described, the actuation of relay MS causes energization of motor 16 and pump 12 to produce pumping of oil by the latter. At the same time, the closing of the thermostat contacts 41 has no effect (under the assumed conditions) on the neutral setting of the valve 14. Hence, all of the oil in the closed loop path 10–15 is recirculated by pump 12 to thereby be heated. Meanwhile, the valve 14 remains at "neutral" (if no up "call" is registered) such that the oil pressure developed by pump 12 is insufficient to move the cab.

The oil is so heated by recirculation until the oil temperature rises to the thermostat cut-out value. Thereupon, the thermostat 40 operates to open contacts 41 to de-energize relay TST so that the motor-controlling TST contacts (line 4) become open to cause de-energization of motor 16 and pump 12 to thereby restore the system to normal condition.

Let us now assume that cab 25 is parked at its upper floor when thermostat 40 is first actuated to signal for heating of the oil. In that instance, the cab is returned to its lower floor before oil heating begins by a sequence of events as follows. When relay TST is energized by the closure of thermostat contacts 41, that relay closes the TST contacts at line 24 to energize down-call relay SD to produce downward movement in the usual manner of the cab 25. During that downward movement, motor-start relay MS (line 5) cannot be energized by the closed TST contacts at line 4 because down-movement relay DX (line 16) is energized to open the DX contacts at line 5 to thereby cut off the current supply to relay MS. When, however, the cab 25 reaches its lower floor, the cab opens the contacts of switch 80 to de-energize relay DX so as to produce closing of the DX contacts at line 5 and restoration of the current supply to relay MS. The latter relay then becomes energized through the closed TST contacts at line 4 to start-up the pump motor 16 to cause recirculatory pumping of oil and heating thereof until the oil temperature rises to the thermostat cut-out valve. If meanwhile, there is no up movement of the elevator and a subsequent down movement thereof, valve 14 remains at neutral because none of solenoids 51, 52, 71 and 72 become energized.

It might be noted that the TST contacts at line 24 are closed by the actuation of thermostat 40 even when cab 25 is then parked at its lower floor. In those circumstances, contacts 80 (line 16) are open to prevent energization of relay DX and consequent opening of the DX contacts at line 5. Hence, if cab 25 is parked at it lower floor when thermostat 40 is first actuated, the resulting closure of the TST contacts at line 24 does not prevent the energizing of the motor start relay MS by the opening of the DX contact at line 5.

It may be, that while cab 25 is parked at its lower floor and oil is being recirculated in path 10–15 for heating purposes, an up "call" for the cab is registered by the pressing of the button 50. In that instance motor 16 and pump 12 have already been actuated (by the closing of the TST contacts at line 4). In the presence of such up "call," the system 29 operates to move the cab to the upper floor in much the same way as before described. Note, however, that, although the sequence of operations for moving the cab upwards includes the same steps as for the condition in which thermostat 40 is deactuated, the closure during that sequence of the contacts U at line 5 is redundant in that it does not perform its previous function of initiating energization of pump 12. In fact, the closure of contacts U performs no function at all because the pump is already energized. Otherwise, however, the FIG. 2 system responds normally to an up "call." It will be seen, therefore, that the heating of the oil under thermostat control does not interfere in any way with the ability of the system to answer up "calls."

When, while thermostat 40 is activated, the cab reaches its upper floor in response to an up "call," contacts 65 (line 13) are opened to drop out relay UX and cause opening of the UX contacts at line 7 to drop out relay U (line 8) and cause opening of the U contacts at line 5. The opening of these latter contacts does not of itself de-energize the motor start relay MS because the U contacts are bridged by the still closed TST contacts at line 4. The dropping out of the UX relay has, however, the further effect of closing UX contacts of line 16 to permit energization of relay DX through the last-named contacts and through the SD contacts at line 15, such SD contacts being now closed because the SD relay is energized by the closed condition of the TST contacts at line 24. When relay DX is so energized, it opens the DX contacts at line 5 to cut off the power to relay MS to thereby stop pump motor 16.

When the cab comes to rest at its upper floor, the door thereof automatically opens. The opening of the cab door de-energizes relay DO (line 12) to maintain open the DO contacts at line 9. When those contacts are open, the down solenoids 71, 72 cannot be energized to produce downward movement of the cab. Note, however, that while thermostat 40 is actuated to maintain closed the TST contacts at line 24, the connection of those contacts to the SD relay cause that relay to be energized even in the absence of a pressing of the down button 70. Further, the energized SD relay maintains closed the SD contacts at line 15 to maintain the DX relay energized. Hence, a subsequent closure of the cab door initiates automatically (i.e. without a pressing of down call button 70) the sequence of operations which produces downward return movement of the cab to its lower floor. During such sequence, motor 16 is de-energized despite the closed condition of the TST contacts at line 4 because, relay DX is energized to maintain open the DX contacts at line 5 to thereby cut off the power for motor start relay MS. Upon completion, however, of the downward movement of the cab, relay DX is de-energized (by the opening of contacts 80 at line 16), wherefore the DX contacts at line 5 become closed to restore power to relay MS through the closed TST contacts at line 4. The actuation of relay MS re-energizes motor 16 and pump 12 to cause renewed recirculation of oil in the path 10–15 for the purpose of heating that oil.

It might be thought that, when thermostat 40 is actuated to keep closed the TST contacts at line 24 to thereby maintain the SD relay energized, such continuous energization of the SD relay would disable the system from moving the cab from its lower to its upper floor in answer to an up "call." Despite, however, the actuation of the SD relay, the system can respond to an up "call" for reasons as follows. Although relay SD is energized while the cab is parked at its lower floor, relay DX is de-energized because contacts 80 at line 16 are open when the cab is so parked. When, in response to an up "call," the SU relay becomes energized so as to energize relay UX as described, the resultant opening of the UX contacts at line 16 locks out the downward movement relay DX so that such relay cannot become energized even when contacts 80 close as the cab moves upward from its lower floor. Hence, the cab continues with its upward movement until (when the cab reaches its upper floor) the UX relay is de-energized, as described, to produce closure of the UX contacts at line 16 and subsequent energization of the DX relay.

When an up-leveling movement of the cab is required while thermostat 40 is actuated and the cab is parked at its lower floor, such movement is effected in the same way as before described, the closure of contacts U being again redundant because those contacts are bridged by the already closed TST contacts at line 4. When a down-leveling movement of the cab is required, such movement is effected despite the closed condition of those TST contacts (which tend to maintain motor start relay MS and pump motor 16 energized) by virtue of the fact that the energization of the down-leveling relay LD (line 3) opens LD contacts at line 5 to thereby cut-off the power for the MS relay.

From the foregoing description the following should be evident. First, if thermostat 40 should initially be actuated when he cab is in the course of a downward movement in answer to a call, the cab will complete the movement in a normal manner and will then remain parked at its lower floor (in the absence of an up call) while the oil of the system is heated to the thermostat cut-off value by recirculation of the oil. On the other hand, if thermostat 40 should first be actuated while the cab is in the course of an upward movement in answer to a call, the cab in the normal manner will move to and stop at its upper floor and then be returned to its lower floor to there remain parked (in the absence of an up "call") while the oil is heated by recirculation.

Second, over the period in which the oil temperature is rising from the thermostat cut-in value to the thermostat cut-off value, the heating of the oil by recirculation is continuous except in those instances where a downward movement of the cab is required. In such instances the recirculatory heating of the oil is rendered intermittent because of interruption of the heating period by one or more intervals during which pump 12 is de-energized to allow the cab to move down. Examples of such instances are where, as described, the cab is returned to the lower floor in response to actuation of the thermostat or after completion of an up call run or in the course of completing a down call run at the time the thermostat is first actuated or, alternatively, where the cab undergoes a down leveling movement.

Third, and by way of summary, the described recirculatory heating of the oil under thermostat control is fully compatible with the ability of the elevator installation during the oil heating period to respond in a normal manner to either an up "call" or a down "call" and to undergo normal up-leveling and down-leveling movements.

Having described our embodiment of the invention, we wish it to be understood that we do not wish to be limited to the exact details shown and described, for obvious modifications will occur to a person skilled in the art.

What is claimed is:

1. In hydraulic elevator equipment in which computer means responds to elevator calls to control pump means and valve means to vary the amount of hydraulic fluid in jack means for a cab so as to move said cab to answer said calls, the improvement comprising thermostat means responsive to a drop in fluid temperature to a selected low value to produce a signal indicating need for heat and lasting for a period terminated by deactuation of said thermostat means in response to a rise in said temperature to a selected higher value, and circuit means responsive to said indicating signal to effect said rise by energizing said pump means to pump said fluid so as to produce turbulent heating thereof, said circuit means being interconnected with said computer means to enable said cab to move during said period in response to production of movement signals for said cab.

2. Equipment according to claim 1 in which said pump and valve means are components of a closed loop circulation system for said fluid, and in which said thermostat means is disposed to sense the temperature of the fluid in said closed loop system.

3. Equipment according to claim 2 in which said jack means is fluid-coupled to said closed loop system to provide for an exchange of fluid between said jack means and system, said computer means controls the flow of fluid between said system and jack means so as, selectively, to produce up and down movements of said cab and maintain said cab stationary, and in which said circuit means responds to said indicating signal to energize said pump means to heat said fluid by producing recirculation in said system of the portion of said fluid contained in said system as opposed to the portion of said fluid contained in said jack means.

4. Equipment according to claim 3 in which said circuit means is interconnected with said computer means to cause the latter to move said cab to the lowest floor when said cab is above such floor at the time such indicating signal is first produced.

5. Equipment according to claim 3 in which, in the absence of production of a movement signal for said cab, said circuit means and computer means render said pump means continuously energized and said cab stationary over said period of said indicating signal.

6. Equipment according to claim 3 in which an up movement of said cab is produced by energization of said pump to pressurize said fluid and by setting of said valve means by said computer means to produce a flow of such pressurized fluid into said jack means, and in which, while said pump is energized by said circuit means in response to said indicating signal to pressurize and heat said fluid, said computer means is responsive to an up signal for said cab to set said valve means so as to produce said flow of fluid into said jack means.

7. Equipment according to claim 6 in which said up signal is an up call.

8. Equipment according to claim 6 in which said up signal is an up leveling signal.

9. Equipment according to claim 3 in which a down movement of said cab is produced by maintaining said pump means de-energized and by setting said valve means by said computer means to produce a flowing of fluid out of said jack means and into said system under the weight of said cab, and in which said circuit means and computer means are interconnected to maintain said pump means de-energized in the concurrent presence of said indicating signal from said thermostat means and a down signal for said cab until after completion of the down movement required by said down signal, said pump means thereupon becoming energized by said circuit means in response to said indicating signal.

10. Equipment according to claim 9 in which said down signal is a down call.

11. Equipment according to claim 9 in which said down signal is a down leveling signal.

12. Equipment according to claim 9 in which said down signal is a signal requiring lowering of said cab of the lowest floor and produced by said circuit means in response to said indicating signal in the event said cab is above said floor when said indicating signal is first produced.

13. In a method of operating a hydraulic elevator installation in which valve means is adjustable in setting in response to registration of movement signals for the elevator cab to selectively control the direction and amount of flow of hydraulic fluid between jack means for said cab and a closed loop fluid flow path including selectively energizable pump means for pressurizing said fluid, the improvement comprising, adjusting said valve means to a neutral setting at which said fluid when pressurized by said pump means is incapable of operating said jack means to move said cab upwards, thereafter continuously maintaining said valve means at said neutral setting for at least the duration of a period characterized by the absence of registration of movement signals for said cab, and energizing said pump means after adjustment of said valve means to said neutral setting and during at least part of the duration of said period to pressurize said fluid and produce recirculation thereof in said closed loop path.

14. In a method of operating a hydraulic elevator installation in which valve means is adjustable in setting to selectively control the direction and amount of flow of hydraulic fluid between jack means for the elevator cab and a closed loop fluid flow path including pump means for pressurizing said fluid, the improvement comprising, sensing the temperature of fluid in said path to produce first and second signals when, respectively, said temperature drops to a first preselected value and thereafter rises to a second higher preselected value, and controlling said pump means by said signals to energize said pump at least intermittently over a period initiated by said first signal and terminated by said second signal so as to produce recirculation and resultant heating of fluid in said path and a consequent increase of the temperature of such fluid from said first to said second temperature value.

References Cited

UNITED STATES PATENTS

| | | | |
|---|---|---|---|
| 2,166,940 | 7/1939 | Conradson | 60—52 |
| 3,057,160 | 10/1962 | Russell | 187—17 |

HARVEY C. HORNSBY, Primary Examiner

U.S. Cl. X.R.

60—52; 187—1, 29